Aug. 25, 1931.  J. LINGLER  1,820,394
METHOD OF FUMIGATING WITH CALCIUM CYANIDE
Filed March 9, 1929

INVENTOR
JOHANN LINGLER
BY
J. S. Wooster
ATTORNEY

UNITED STATES PATENT OFFICE

JOHANN LINGLER, OF OFFENBACH-ON-THE-MAIN, GERMANY, ASSIGNOR TO DEUTSCHE GESELLSCHAFT FUER SCHAEDLINGSBEKAEMPFUNG M. B. H., OF FRANKFORT-ON-THE-MAIN, GERMANY, A CORPORATION

METHOD OF FUMIGATING WITH CALCIUM CYANIDE

Application filed March 9, 1929, Serial No. 345,765, and in Germany March 12, 1928.

The present invention relates to the generation of prussic acid from alkaline earth cyanide compounds, for example calcium cyanide or magnesium cyanide or substances or compounds containing these, particularly for the purpose of destroying vermin.

The destruction of vermin by means of, for example, calcium cyanide is usually effected by decomposing calcium cyanide in a finely divided form by the action of the moisture contained in the air whilst generating prussic acid, for example in such a manner that the pulverous calcium cyanide is dispersed in the space to be treated with gas. This method of operation has considerable difficulties. For the purpose of effecting a successful treatment with gas it is necessary to obtain as high a concentration of gas as possible within the shortest possible period of time. For example, when treating with gas trees and other plants damage to the leaves must be avoided. For these and other reasons the treatment with gas must always be effected with an amount which is suited as accurately as possible to the size of the space to be treated with gas. The amount of pulverous, readily decomposed, poisonous calcium cyanide causes considerable difficulties and inconveniences particularly when treating with gas trees, which operation as is well known is as a rule effected during the night. The quantities of pulverous material to be used, as stated above, must be made to suit the sizes of the spaces to be treated with gas, which latter in turn for example depend upon the size of the trees to be treated.

As indicated above it is consequently always necessary to use different but accurately determined quantities in order to effect with certainty the result aimed at, and to avoid "burning" of the foliage. The adjustment of the quantity is rendered more difficult as the operation must be carried out with closed measuring apparatus.

According to my invention I am able to eliminate these and other difficulties in fumigation due to the use of the media in question in the form of powder, from a purely technical point of view by converting the media which are available at the start in the form of powder first into solid form then again converting them into the form of powder and distributing the powder thus produced into the space to be fumigated.

According to my invention I effect this by converting the pulverous alkaline earth cyanide compounds into easily manipulated bodies which can be easily formed into doses and after forming them into doses again converting them into the pulverous condition and subsequently decomposing them in the usual manner by the action of the air or the moisture respectively contained therein.

I have found, for example, that it is possible to convert calcium cyanide and the like into shaped bodies such as slabs, briquettes and the like, which have a sufficient mechanical strength and durability and also have the great advantage that they will readily fall, for example by simple pressure, into the form of powder. By reason of this double property, which was by no means anticipated, it has been rendered possible to produce shaped bodies of definite hydrocyanic acid content for example in such a manner that the external shape of the body, for example cube, ball, cylinder or the like, indicates the effective hydrocyanic acid content, whereby the dosing is rendered very certain that, for example, in the dark when the fumigation of plants, shrubs, trees or the like has to be carried through it is possible to ascertain by the touch of the hand the shape of the body and thus the hydrocaynic acid content.

According to one method of carrying my invention into effect the procedure, for example, may be such that the shaped bodies, for example in the form of plates or slabs are provided with flutings, grooves or the like which enable the body to be easily subdivided at the point of use for example by simply breaking away. In this manner any suitable intermediate weights can be obtained.

The conversion of the pulverous cyanide compounds into shaped bodies may as I have found, be effected without the co-operation of binding agents. It is sufficient to press the pulverous material, according to the usual methods, by means of pressure in suitable moulds. By a suitable selection of the pressure I can influence the strength of the shaped bodies to a large extent.

In comparison with the pulverous material used hitherto, which very readily falls to pieces and consequently can only be transported and handled in very efficiently closed vessels, the use of shaped bodies has the further advantages that they have a comparatively good durability whereby their handling is considerably facilitated. The shaped bodies through the action of air are covered by a thin superficial protecting layer which protects the contents effectively against decomposition. Artificial protecting layers may also be applied but as I have indicated this is not necessary as a rule.

According to one method of carrying my invention into effect other auxiliary substances, for example such as are also capable of acting upon the vermin to be destroyed, as for example nicotine or suitable nicotine compounds, as for example nicotine sulphate pyrethrum derris root or stimulating or preventative substances, which volatilize simultaneously with the hydrocyanic acid which is given off may be incorporated with the pulverous alkaline earth cyanide compounds or the shaped bodies to be produced therefrom.

The use of the shaped bodies may for example be such that pieces having a hydrocyanic acid content corresponding with the space or the article to be treated with gas are placed into a simple device which can be easily transported and easily manipulated in which it is caused to fall into the pulverous condition by the application of pressure, grinding or other mechanical treatment, the powder being preferably immediately dispersed for example by blowing into the space to be treated with gas.

Devices suitable for effecting the treatment with gas for destroying vermin and the methods of operation to be followed when using these devices are described hereinafter.

When using means for destroying vermin by fumigation in the preferred form as indicated and mainly for the purpose of obtaining a convenient dosing the difficulty is met with that it is necessary before introducing these substances into the dispersing device to first bring them into a sufficiently fine form, preferably into the form of powder, during which operation it is necessary to consider that very poisonous bodies are being dealt with so that particular care must be taken when reducing to powder, this being particularly the case when the devices at the point of use mostly have to be operated by unskilled persons.

According to my invention I proceed preferably in such a manner that the comminution of the substances to be dispersed as also the production of the air stream and the dispersion by the air stream are effected by means of one and the same device, preferably by actuating one and the same operating member, for example, by hand.

As means for the production of the air stream any suitable devices of known type may be used as, for example, piston air pumps with a straight line guide of the member which effects the movement of the air, as also such having a rotary movement, as for example fans, rotary blowers or the like.

For the purpose of comminuting the vermin destroying media comminuting devices of the most diverse character with grinding, friction or impact action are suitable as for example rollers rolling upon one another or discs or plates provided with grooves or recesses, which are moved past the surface of the piece to be comminuted under pressure, or grinding devices of the type of coffee grinding machines or finally those of the character of devices based on the impact action of rotary parts, for example, of the type of so-called impact or perplex mills or the like. In the latter case the movement of the rotary members can be effected with advantage, if desired also while giving these a particular construction, simultaneously for the production of the necessary air stream.

The comminuting members may be arranged either in the same space in which the moving air stream is produced for example in such a manner that the comminuted material passes directly into the moving air stream, whilst if desired the members for producing the movement of the air are arranged simultaneously as comminuting members, or may be provided with such members, or arranged in such a manner that the comminuting members, for example, are arranged so as to be conveniently accessible from outside the casing of the blower, the pump or the like, or they may be mounted in a separate chamber for example leading to the actual air chamber, which separate chamber is then preferably provided at its lower end with an outflow opening leading into the air chamber and through which the comminuted or pulverous substances, preferably under the action of gravity, pass into the air stream so that they are carried away with this. The introduction of the powder may be effected before, at or behind the actual driving members for the air, thus both into the stream of inflowing air and into the stream of outflowing air, in the latter case provision is made, by providing nozzle arrangements of known type, in which the outflowing air exerts a suction action on the chamber containing the comminuting members or upon the comminuted material itself, for example, in such a manner that the conveyance of the latter is mainly due to the suction action. In all cases it is advisable to positively connect the comminuting members with the members adapted to produce the movement of the air and to the common operating member in such a manner that the movement of all these parts may be effected simultaneously by the same driving member, preferably by hand.

Further, particularly the comminuting devices, having regard to the fact that outflow of the comminuted substances must not only be avoided by reason of loss of material, but also by reason of the poisonous nature of the substances which mostly come into consideration, must preferably be so constructed and arranged that such an outflow, for example, under the action of the air compressed in the device, cannot occur.

In the accompanying drawings are illustrated by way of example three forms of construction, which have been selected from a number of possible forms of construction, the devices being illustrated diagrammatically whilst omitting all details such as stuffing boxes and the like. But I want it to be understood that I do not want to be limited to the devices described.

Figure 1:
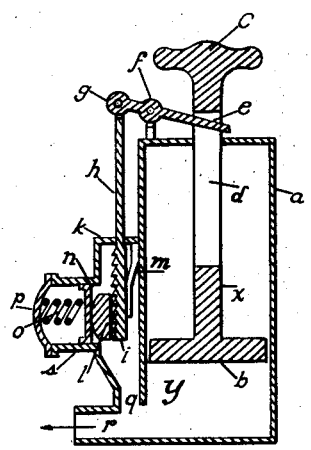
Fig. 1 is a vertical section of a device, embodying my invention.

Figure 1 shows an arrangement in which the movement of the air is produced by an ordinary piston air pump and the comminution of the material is effected by a ribbed plate which is moved past the material in the form of a briquette in a separate chamber and is positively connected to the piston rod of the air pump. In the device according to Fig. 2 the movement of the air is also produced by a pump piston which at the same time carries the material to be comminuted, the comminution thereof being effected by means of a disc provided with grooves and positively rotated during the movement of the piston.

Figure 3:
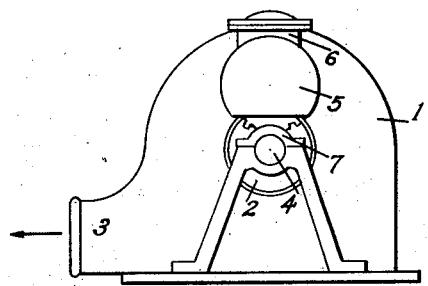
Fig. 3 is a side view of another modified form of my invention.

Figure 3 shows in side elevation a rotary blower in which the material to be comminuted is arranged at the upper portion of the inlet opening and is rubbed into powder by means of a grooved disc which is rotated underneath it by the shaft of the blower.

In Figure 1 $a$ indicates the cylindrical pump casing provided at its lower end with an outlet opening $r$ for the compressed air, $b$ is the piston, $x$ the piston and rod and $c$ the handle provided at the upper end thereof, $d$ is a longitudinal slot in the piston rod in which is guided a rod $e$ pivotally mounted at $f$ and pivotally connected at $g$ to the vertical arm $h$ the lower end of which projects into a chamber $y$ separate from the actual pump chamber and in this chamber carrying a grooved plate or disc $i$ pressed against the briquette $l$, consisting for example of calcium cyanide, by the action of a spring $m$ and on the movement of the piston rod $x$, by reason of its positive connection with the arms $e$ and $h$ moves upwards and downwards in the opposite direction to the piston rod and thus rubs the briquette into powder, this powder then flowing out through the outlet opening $q$ at the lower end of the chamber $y$ into the stream of air flowing out at $r$. In order to press the briquette $l$ uniformly against the disc $i$ and at the same time obtain a fluid tight closure to the outside there is provided in the laterally disposed pipe $s$, for the introduction of the briquette into the chamber $y$, a plate of sheet metal or the like which closes tightly against the inner walls of the pipe or is secured in a fluid tight manner by any other means, this plate being pressed against the briquette $l$ by the action of a spring $o$ of which the other end bears against the cover $p$.

Figure 2:
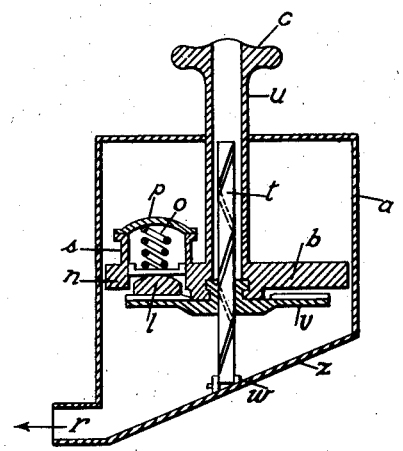
Fig. 2 is a vertical section of modified form of my invention.

In the device shown in Figure 2 $a$ again indicates the cylindrical pump casing, provided at its lower end with the inclined bottom $z$ and the air outlet $r$, $b$ the piston which in this case is driven by the tube $u$ provided with a handle $c$. On the upper surface of the piston is provided the device similar to that shown in Figure 1 for comminuting the briquette, but in this case it is arranged at right angles, the arrangement being such that the briquette passes downwardly through a hole in the piston and there bears resiliently upon the upper surface of a round plate $v$ provided with grooves and which is connected to the lower portion of the piston in such a manner that it can turn freely and thus effect the comminution of the briquette $l$ by the rubbing action of its grooved upper surface. In order to rotate this disc positively during the upward and downward movement of the piston this disc has the central bore thereof guided on a rod $t$ which at $w$ is secured to the bottom $x$ of the pump casing and is provided with a spiral groove with which engages a pin or other projection in the bore of the disc $v$ so that at the up and down movements of the piston the disc whilst also carrying out these movements is caused to rotate by the engagement of the projection in the spiral groove.

In Figure 3, 1 indicates the casing of the rotary blower with the air inlet opening 2 and the outlet opening 3, 4 being the shaft to which is keyed a toothed or friction wheel located between the bearing 7 and the suction opening 2, which drives a rotary disc, for example through a gearing mounted in the casing 5, which plate is provided with grooves in a suitable manner and is moved past a briquette, introduced through the pipe 6 in a similar manner as in Figures 1 and 2, in such a manner that the powder which is formed directly passes into the stream of air sucked in through 2.

With devices of this character the comminuting device can for example also be arranged in the outflow pipe instead of in the inflow pipe, in which case provision is made for a suitable intermediate gear for the driving thereof from the main shaft of the blower. In the device according to Figure 1 the method of connection of the rod $h$ to the piston rod by means of a lever $e$ may also be effected by other means for transmitting the movement of the piston rod to the rod $h$, for example, by means of a gear operating in the same direction of movement of the piston rod, for example rack mechanism, if desired with a transmission gear, or any other suitable positive drive. When using devices with rotary members provided for example with impact pins it is advisable to arrange in front of the inlet for the material into the actual operating chamber also a simple device for coarse comminution of which the drive is preferably also effected positively with the other members.

By my invention I am enabled to achieve the fumigation of trees, shrubs or the like in the shortest possible time and very efficaciously even in night time without incurring the risk of damaging the plants to be fumigated through overdosage.

What I claim is:

1. A method of fumigating which consists in converting a cyanide of a metal selected from the group comprising alkaline earth metals and magnesium, into shaped bodies, reducing the shaped bodies into powder, and blowing the said powder into the space to be fumigated.

2. A method of fumigating which consists in converting a cyanide of a metal selected from the group comprising alkaline earth metals and magnesium, into shaped bodies of a size the hydrocyanic acid content of which corresponds to the amount required for fumigating, reducing the shaped bodies into powder, and blowing the said powder into the space to be fumigated.

3. A method of fumigating which consists in converting a cyanide of a metal selected from the group comprising alkaline earth metals and magnesium, into shaped bodies which allow of subdivision of definite size and hydrocyanic acid contents, reducing the shaped bodies into powder, and blowing the said powder into the space to be fumigated.

4. A method of fumigating which consists in converting a cyanide of a metal selected from the group comprising alkaline earth metals and magnesium, into shaped bodies, reducing same into powder by grinding, and blowing said powder into the space to be fumigated.

5. A method of fumigating which consists in converting a cyanide of a metal selected from the group comprising alkaline earth metals and magnesium, into shaped bodies, reducing same into powder by means of a grinding device which also blows the powder produced into the space to be fumigated.

6. In combination, a closed container having an abrading surface, means for yieldingly holding a shaped solid body against said surface, means for causing relative movement between said surface and said body whereby said body is powdered, and means for blowing the powder out of said container.

Signed at Frankfort A/M, Germany, this 9th day of October, A. D. 1929.

JOHANN LINGLER.